United States Patent
Wang (10) Patent No.: US 7,684,445 B2
(45) Date of Patent: Mar. 23, 2010

(54) METHOD AND RELATED CIRCUIT OF GUARD INTERVAL LENGTH DETECTION FOR OFDM SIGNALS

(75) Inventor: Hung-Hsiang Wang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 509 days.

(21) Appl. No.: 11/539,741

(22) Filed: Oct. 9, 2006

(65) Prior Publication Data

US 2008/0084816 A1 Apr. 10, 2008

(51) Int. Cl.
*H04J 3/06* (2006.01)
(52) U.S. Cl. .................. 370/516; 375/360
(58) Field of Classification Search ........... 370/516
See application file for complete search history.

(56) References Cited

U.S. PATENT DOCUMENTS 5,991,289 A * 11/1999 Huang et al. ............ 370/350
6,928,048 B1   8/2005 Do et al.
2003/0219084 A1* 11/2003 Parker .................... 375/343
2004/0223449 A1* 11/2004 Tsuie et al. ............. 370/204
2005/0105659 A1*  5/2005 Sheu et al. ............. 375/360
2006/0120468 A1   6/2006 Lin et al.

OTHER PUBLICATIONS

Liu et al., "A Novel Synchronization Scheme in HDTV System with Adaptive Detection and Low Emplementation Complexity," ASIC, 2005. ASICON 2005. 6th International Conference on Shanghai, China 24-27; Oct. 24, 2005; pp. 330-333.
European Search Report for EP 06 02 3994 dated Dec. 19, 2007.

* cited by examiner

*Primary Examiner*—Huy D Vu
*Assistant Examiner*—Michael J Digiovanni
(74) *Attorney, Agent, or Firm*—Alston & Bird LLP (57) ABSTRACT

A guard interval length detector is introduced. The guard interval length detector includes a delay conjugate multiplier capable of delaying a plurality of input signals to provide delayed input signals and multiplying each of the plurality of input signals with a complex conjugate of a corresponding one of the delayed input signals to provide multiplied signals, a phase detector capable of determining phase values corresponding to the multiplied signals, and a period detector capable of detecting a period according to the phase values, and determining a guard interval length of the input signals according to the period.

33 Claims, 12 Drawing Sheets

METHOD AND RELATED CIRCUIT OF GUARD INTERVAL LENGTH DETECTION FOR OFDM SIGNALS

BACKGROUND OF THE INVENTION

The present invention generally relates to an OFDM receiver and, more particularly, to a guard interval length detector for OFDM signals and a method of operating the same.

In telecommunications, guard intervals are used to ensure that distinct transmissions do not interfere with one another. These transmissions may belong to different users, as in TDMA systems, or to the same user, as in OFDM systems. Due to the immunity against multipath reflection distortion, OFDM becomes one of the main stream techiniques of communication and digital terristrial broadcasting application nowadays. Digital Audio Broadcasting (DAB) and Digital Video Broadcasting (DVB) are two of the examples, wherein DAB is a technology for broadcasting audio programming in digital form, and DVB is a standard for broadcasting Digital Television over satelite (DVB-S), cable (DVB-C), terrstrial (wireless) transmission (DVB-T), and handheld device (DVB-H). Integrated Service Digital Braodcasting-Terrestrial (ISDB-T), the digital television and digital audio broadcasting format that Japan has created, is another example of the applications adopting OFDM scheme. Moreover, the applications that adopt OFDM technology still comprise Asymmetric Digital Subscriber Line (ADSL), Very-high-speed Digital Subscriber Line (VDSL), Wireless Local Area Network (WLAN) including IEEE 802.11a/g/n, Ultra Wideband (UWB), and Dedicated Short Range Communications (DSRC) systems.

The purpose of the guard interval (GI) is to introduce immunity to propagation delays, echoes, reflections, inter-channel-interference (ICI) and inter-symbol-interference (ISI), to which digital data is normally very sensitive. DVB-T defines GI in its specification in order to resist the ISI resulted in the multi-path. Part of the data is duplicated and placed in front of the transmission data packets to be the cyclic prefix. For DVB-T system, there are two modes of effective data length, 2K and 8K, and four different guard interval (GI) lengths, $\frac{1}{32}$, $\frac{1}{16}$, $\frac{1}{8}$ and $\frac{1}{4}$ of the data length, represented by GI=$\frac{1}{32}$, $\frac{1}{16}$, $\frac{1}{8}$ and $\frac{1}{4}$, respectively.

The duplicated GI needs to be removed before the receiver process the data in order to perform the Fast Fourier Transform correctly in accordance with the data length, that is, 2K elements or 8K elements. There have been several methods and related circuits proposed in the prior art to detect the mode of the received OFDM signals and the GI length by performing correlation to the magnitudes of the received signals, taking advantage of the inherent quality of the guard interval. However, the mode detection performed by these convnetional methods and circuits mentioned above is often susceptible to noise, channel effiect and sampling frequecy offset. Hence a normalization is usually required in the prior art. Otherwise, it is often not easy for these methods and devices proposed in the prior art to define the threshold of the correlation of the magnitudes. There are still methods proposed in the prior art to perform correlation to the phases of the received signals. However, these methods in the prior art detect only the beginning of packets but not the transmission mode.

BRIEF SUMMARY OF THE INVENTION

Examples of the present invention may provide guard interval length detectors and related methods that are relatively robust against noise and interference resulting from channel effects and multipath effects in communication systems.

One example of the present invention may provide a guard interval length detector is introduced. The guard interval length detector includes a delay conjugate multiplier capable of delaying a plurality of input signals to provide delayed input signals and multiplying each of the plurality of input signals with a complex conjugate of a corresponding one of the delayed input signals to provide multiplied signals, a phase detector capable of determining phase values corresponding to the multiplied signals, and a period detector capable of detecting a period according to the phase values, and determining a guard interval length of the input signals according to the period.

Another example of the present invention may provide a guard interval length detector that includes a delay conjugate multiplier capable of delaying a plurality of input signals by a duration to provide delayed input signals and multiplying each of the plurality of input signals with a complex conjugate of a corresponding one of the delayed input signals to provide multiplied signals, a first moving sum circuit capable of accumulating a plurality of sets of the multiplied signals to provide auto-correlation signals, wherein each set of the multiplied signals comprises a first amount of successive multiplied signals of the multiplied signals, a phase detector capable of determining phase values of the auto-correlation signals, a phase differential detector capable of determining phase differential values, wherein each of the phase differential values is a difference between two successive phase values, a second moving sum circuit capable of accumulating a plurality of sets of the phase differential values to provide accumulated values, wherein each set of the phase differential values comprises a second amount of the phase differential values, a transition detector capable of detecting a transition of the accumulated values, and a period detector capable of detecting a period according to the transition, and determining a guard interval length of the input signals according to the period.

The other example of the present invention may provide a guard interval length detecting apparatus including a first guard interval length detector capable of performing guard interval length detection corresponding to a first mode of input signals according to phase of the input signals and generating a first detection result, a second guard interval length detector capable of performing guard interval length detection corresponding to a second mode of the input signals according to the phase of the input signals and generating a second detection result, and a checking unit capable of checking if the first detection result provided by the first guard interval length detector conforms to one of a first set of acceptable transition patterns corresponding to the first mode of the input signals, and if the second detection result provided by the second guard interval length detector conforms to one of a second set of acceptable transition patterns corresponding to the second mode of the input signals.

Still another example of the present invention may provide a method of guard interval length detection including delaying a plurality of input signals by a duration, multiplying each of the input signals with a complex conjugate of a corresponding one of the delayed input signal, determining phase values corresponding to the multiplied signals, detecting a period according to the phase values, and determining a guard interval length of the input signals according to the period.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention illustrated in the accompanying drawings. Wherever possible, the same reference numbers will be used throughout the drawings to refer to the same or like portions.

Figure 1:
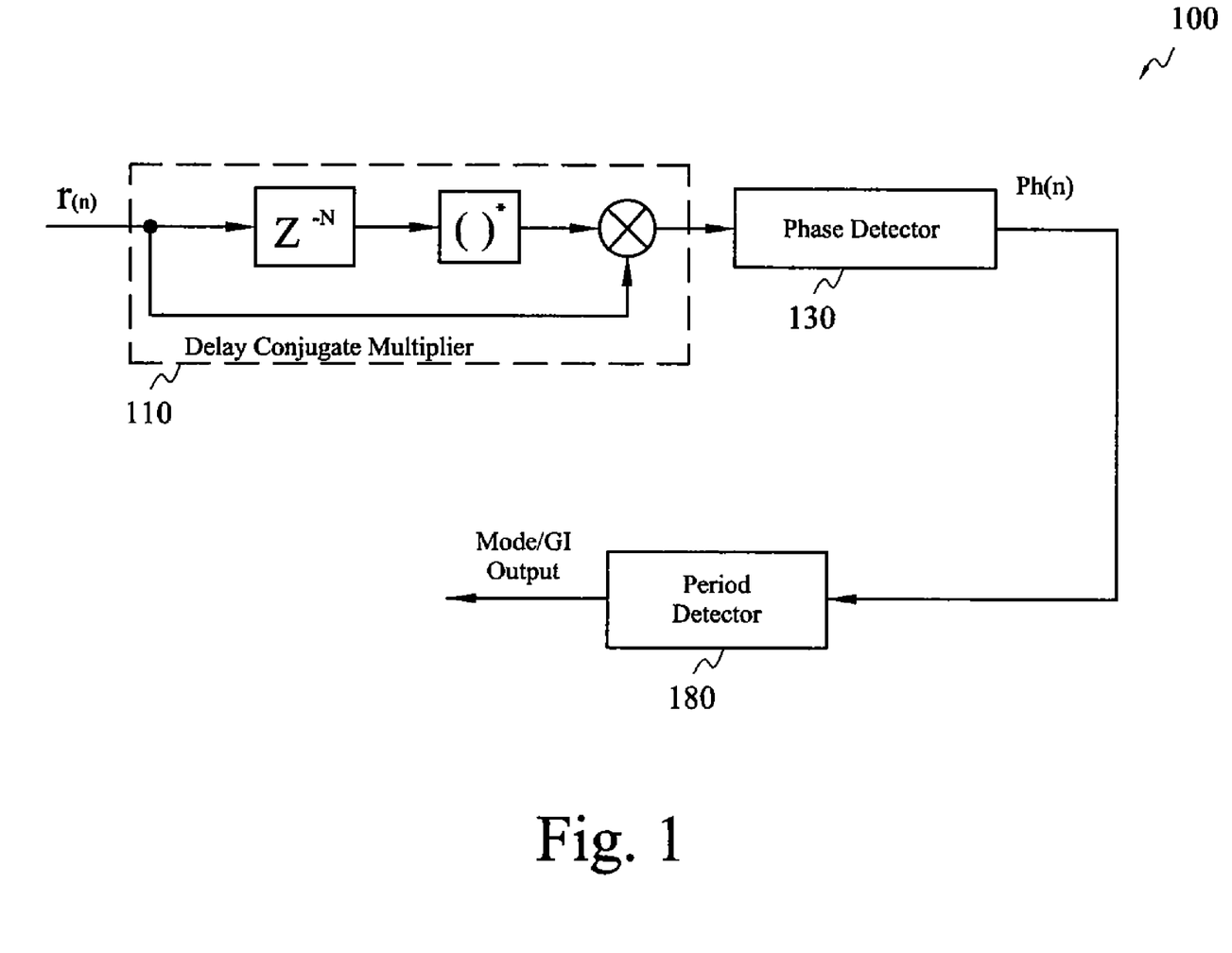
FIG. 1 is a block diagram of a guard interval (GI) length detector according to an example of the present invention.

FIG. 1 is a block diagram illustrating an example of a guard interval (GI) length detector 100 according to the present invention. The GI length detector 100 includes a delay conjugate multiplier 110, a phase detector 130, and a period detector 180. The delay conjugate multiplier 110 receives digitized signals r(n), delays each of the received signals with a delay length N, and then multiplies each of the received signals with a complex conjugate of the each of the delayed signals. The value of the delay length N corresponds to a useful data length of a predetermined mode of the OFDM signals, such as 2048 of the 2K mode or 8192 of the 8K mode in the DVB-T system. The phase detector 130, coupled to the delay conjugate multiplier 110, detects phase values Ph(n) of the multiplied signals provided by the delay conjugate multiplier 110. The period detector 180, coupled to the phase detector 130, determines the symbol length (GI length plus data length) by detecting a period according to the phase values, and determines a guard interval length of the input signals according to the period. As an example of the 2K mode, according to simulation results of the present invention, the adopted guard interval length is $1/32$ times of the data length represented by GI=$1/32$ when the detected period of the characteristic signals is within [2081, 2143], $1/16$ times of the data length represented by GI=$1/16$ when the detected period of the characteristic signals is within [2144, 2239], $1/8$ times of the data length represented by GI=$1/8$ when the detected period of the characteristic signals is within [2240, 2499], and $1/4$ times of the data length represented by GI=$1/4$ when the detected period of the characteristic signals is within [2499, 2599]. Please note that the ranges of the values mentioned above are exemplary only and not restrictive of the present invention.

Figure 2:
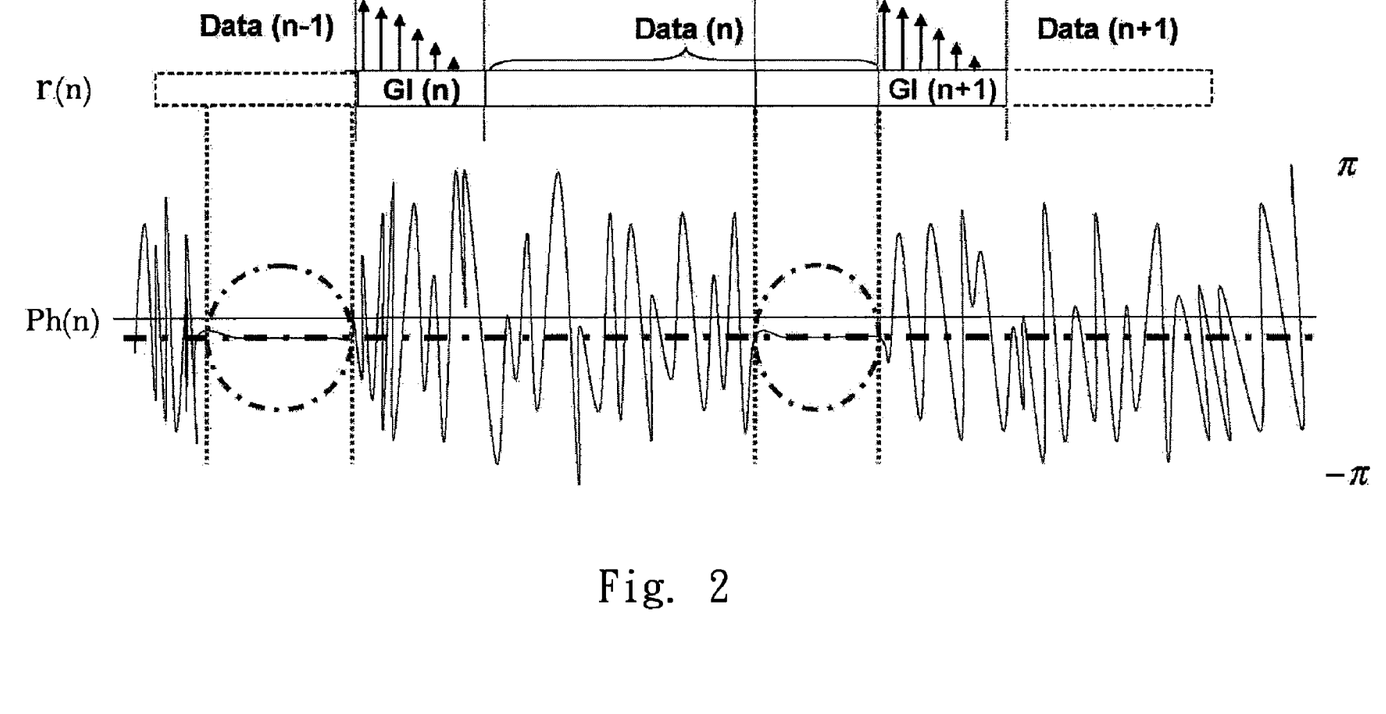
FIG. 2 is a diagram illustrating the relationship between the input signals and the phase values of multiplied signals.

FIG. 2 is a diagram illustrating the relationship between the input signals r(n) with GI and the phase values Ph(n) of the multiplied signals in the GI length detector 100 in FIG. 1. Referring to FIG. 2, the GI length and the corresponding segment of useful data have a relatively high correlation. Hence, the phase of the multiplied signals approaches zero as a segment of useful data corresponds to the GI of the input signals. The GI length detector of the present invention utilizes the phase of the signals to retrieve the information of the guard interval. Moreover, the GI length detector of the present invention and a corresponding receiver may use the same phase detecting circuit.

Figure 3:
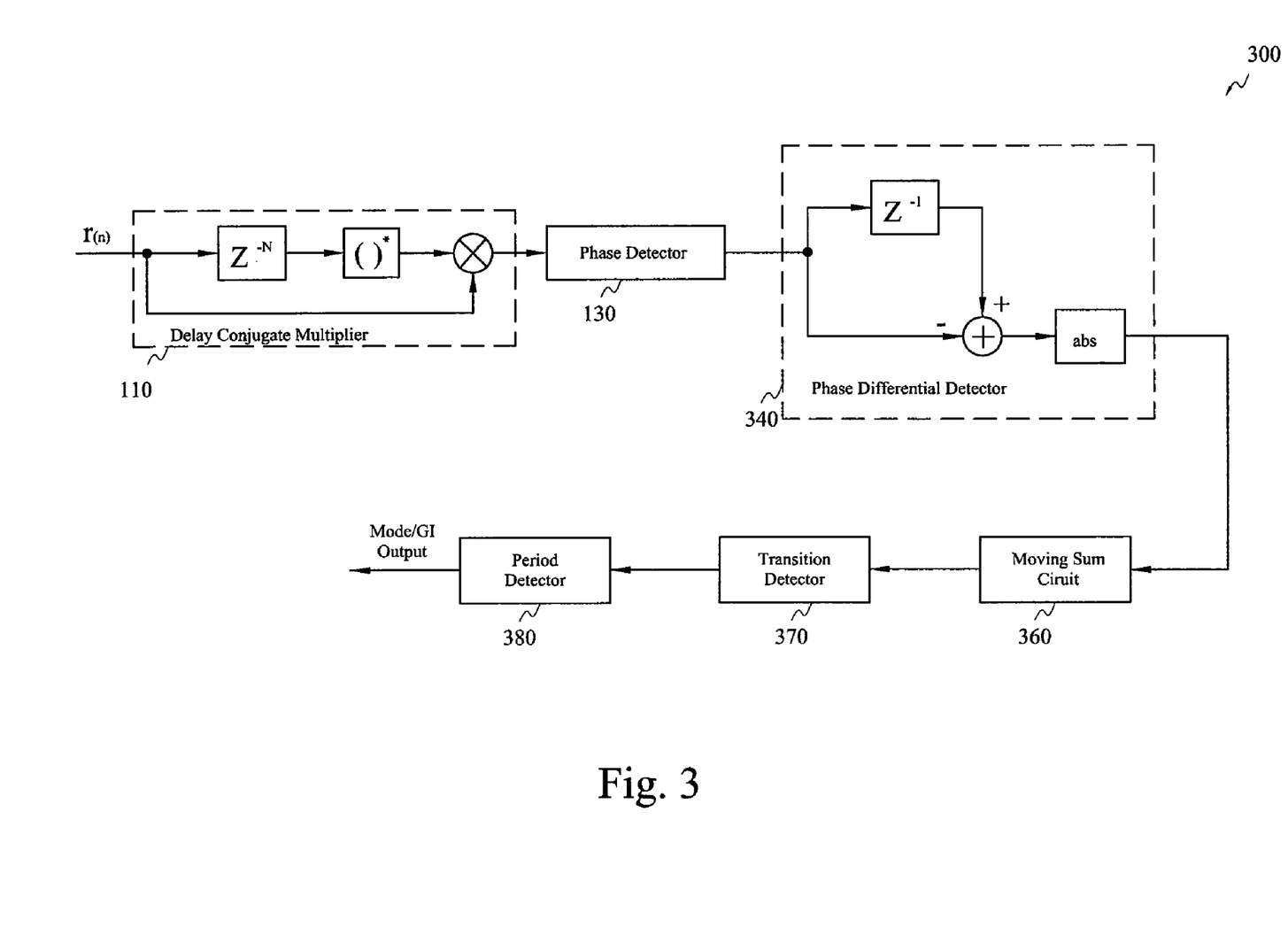
FIG. 3 is a block diagram of a GI length detector according to another example of the present invention.

FIG. 3 is a block diagram illustrating an example of a GI length detector 300 according to the present invention. Referring to FIG. 3, the guard interval length detector 300 is similar to the GI length detector 100 illustrated in FIG. 1 except the addition of a phase differential detector 340 coupled to the phase detector 130, a moving sum circuit 360 coupled to the phase differential detector 340, a transition detector 370 coupled to the phase differential detector 340, and a period detector 380 coupled to the transition detector 370. The phase differential detector 340 is able to detect phase differential values between two successive phase values output by the phase detector 130. The moving sum circuit 360 accumulates the phase differential values detected by the phase differential detector 340. The amount of phase differential values accumulated by the moving sum circuit 360 at a time, that is, the window length of the moving sum circuit 360, may be equal to the shortest guard interval length of available guard interval lengths of a predetermined mode of the input signals. The moving sum circuit 360 includes a leakage filter or other circuits of similar functions in other examples. The accumulated values provided by the moving sum circuit 360 are transmitted to the transition detector 370 for transition detection.

In one example, the transition detector 370 compares the accumulated values with a predetermined threshold, and sets a characteristic signal when the comparison result changes from positive to negative or from negative to positive. Given a quantization range of the summation results (the accumulated values) between 0 and 64, denoted as [0, 64], the threshold is 4 for the 8K mode, or 8 for the 2K mode. In another example, the transition detector 370 compares the accumulated values with a predetermined threshold, and sets a characteristic signal when a first accumulated value is smaller than the predetermined threshold and a predetermined amount of successive accumulated values immediately following the first accumulated value is greater than the predetermined threshold. In one example, in the 2K mode, the transition detector 370 sets a characteristic signal when there are 512 successive accumulated values greater than a predetermined threshold (e.g., 8 with the quantization range of the summation result set to [0, 64]) following an accumulated value, which is smaller than the predetermined threshold. In another example, the transition detector 370 sets a characteristic signal when there are 2048 successive accumulated values greater than a predetermined threshold (e.g., 4 with the quantization range of the summation result set to [0, 64]) following an accumulated value, which is smaller than the predetermined threshold for the 8K mode.

The period detector 380, coupled to the transition detector 370, determines the symbol length (GI length plus data length) by detecting a period according to the characteristic signals set by the transition detector 370, and determines a guard interval length of the input signals according to the symbol length.

In the GI length detector 300, the phase differential values of the input signals are retrieved in the phase differential detector 340 and accumulated in the moving sum window 360 for further processing. Retrieval of the phase differential values eliminates the need of normalization, which is often required in conventional detecting apparatus.

Figure 4:
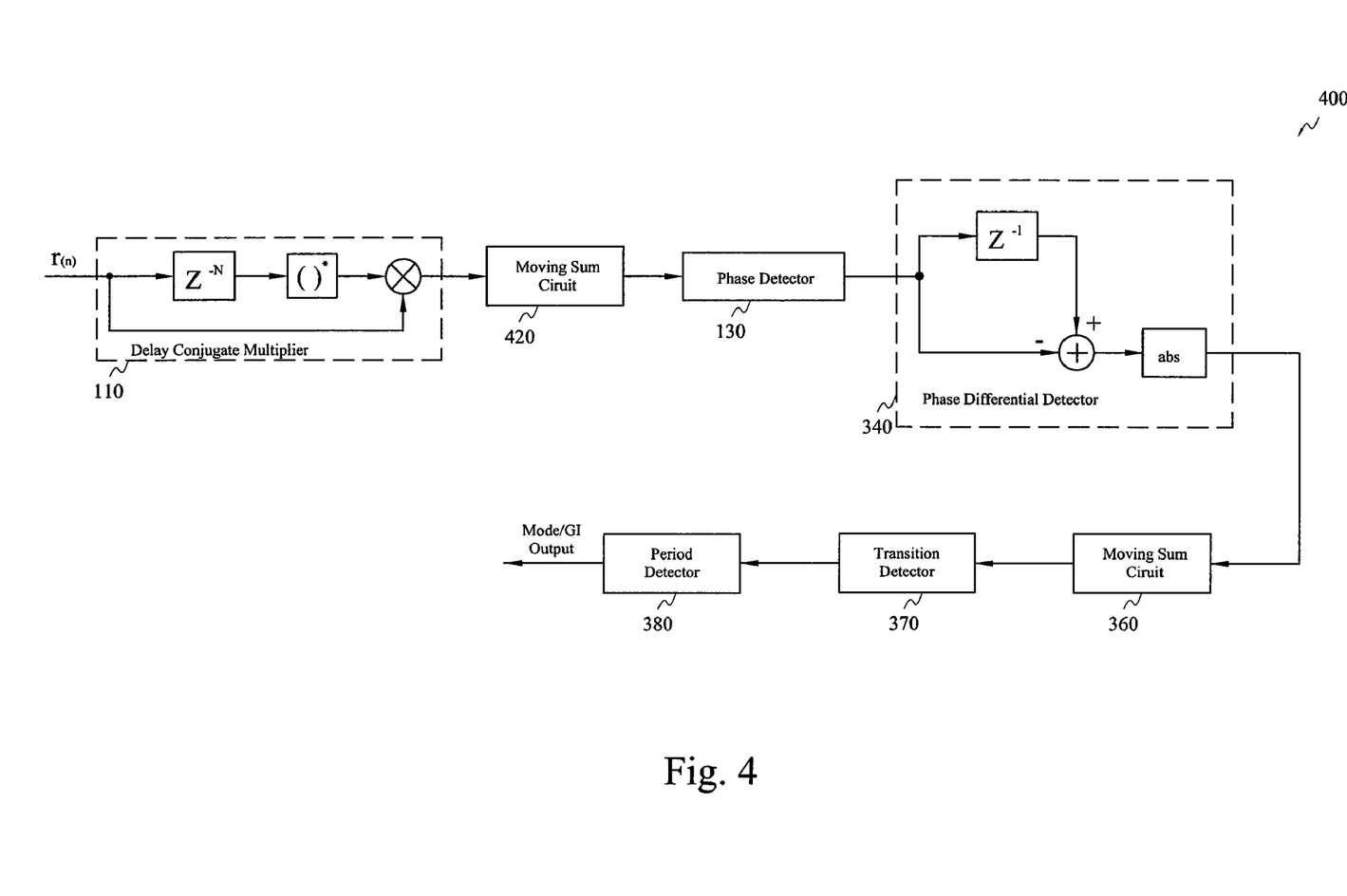
FIG. 4 is a block diagram of a GI length detector according to still another example of the present invention.

FIG. 4 is a block diagram illustrating an example of the guard interval length detector 400 according to the present invention. Referring to FIG. 4, the guard interval length detector 400 is similar to the GI length detector 300 illustrated in FIG. 3 except another moving sum circuit 420 coupled between the delay conjugate multiplier 110 and the phase detector 130. The moving sum circuit 420 receives the multiplied signals from the delay conjugate multiplier 110 and accumulates a predetermined amount of successive delay correlated signals provided by the delay correlation circuit 110 to provide auto-correlation signals. The amount of phase differential values accumulated by the moving sum circuit 420 at a time, that is, the window length of the moving sum circuit 420, may be less than the shortest guard interval length among available guard interval lengths of a predetermined mode of the input signals. The phase detector 130 receives the auto-correlation signals and obtains the phase values of the auto-correlation signals. The phase differential detector 340, coupled to the phase detector 130, is able to detect the phase differential values of two successive input phase values. The window length of the moving sum circuit 360 is decided according to the same rule as that discussed with respect to FIG. 3, which is equal to the shortest guard interval length among available guard interval lengths of the predetermined mode. Subsequently, the transition detector 370 and the period detector 180 detects the transition of the accumulated values from the moving sum circuit 360 and detects the period of the transition detected by the transition detector 370, respectively.

The use of the moving sum circuit 420 in the guard interval length detector 400 may help noise suppression. Furthermore, the moving sum circuit 420 may be used in a carrier frequency offset analyzing circuit in a Pre-FFT module of a corresponding receiver in order to simplify the structure and to reduce the cost of the receiver.

Figure 5:
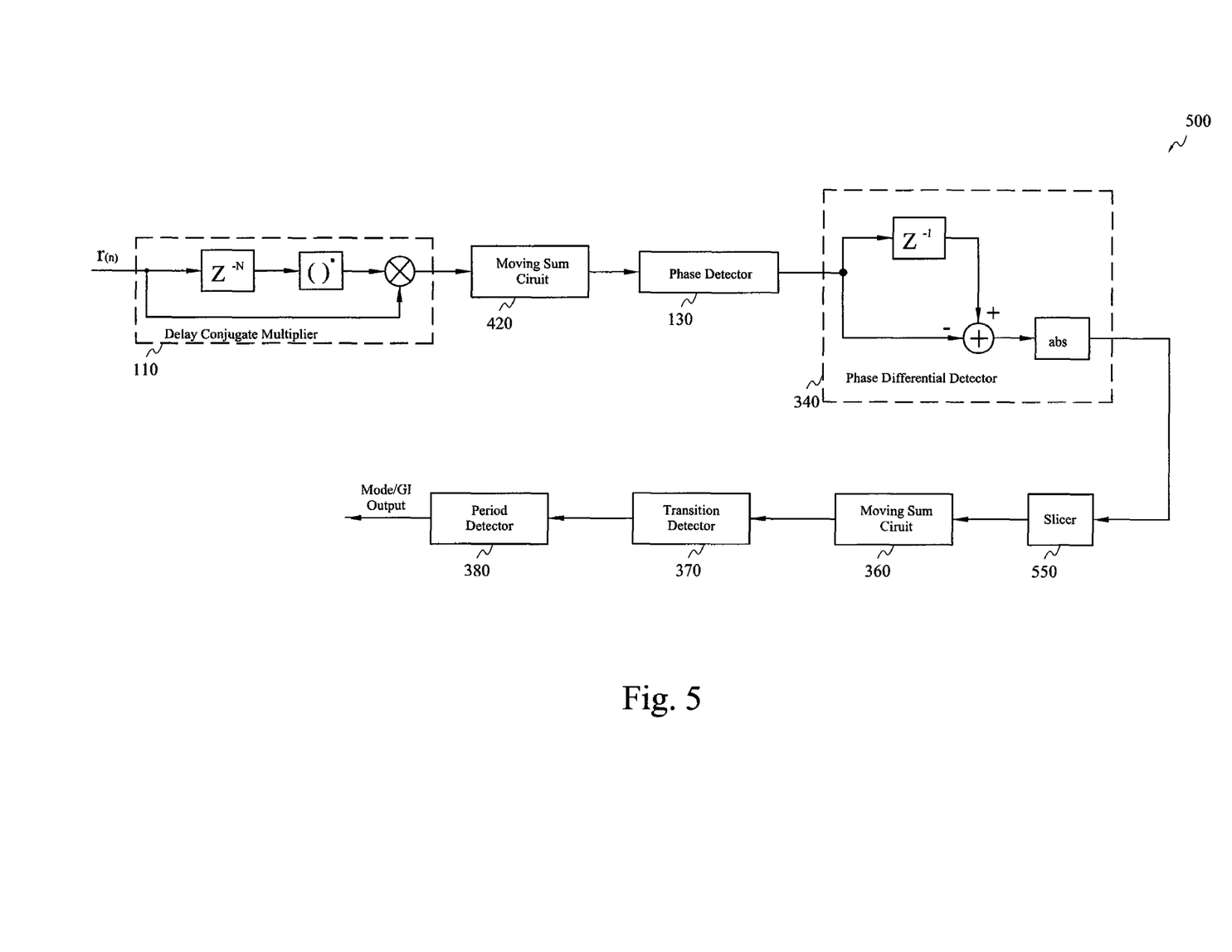
FIG. 5 is a block diagram of a GI length detector according to yet another example of the present invention.

FIG. 5 is a block diagram illustrating an example of the guard interval length detector 500 according to the present invention. Referring to FIG. 5, the guard interval length detector 500 is similar to the GI length detector 400 illustrated in FIG. 4 except a slicer 550 coupled between the phase differential detector 340 and the moving sum circuit 360. The slicer 550 compares the phase differential values output by the phase differential detector 340 with at least one predetermined threshold, and provides result signals corresponding to the comparison. That is, the slicer 550 functions to serve as a digitizer to digitize the phase differential signals. The moving sum circuit 360 accumulates a plurality of sets of the sliced/digitized signals from the slicer 550. The window length of the moving sum circuit 360 is decided according to the same rule as that discussed with respect to FIGS. 1, 3 and 4, which is equal to the shortest guard interval length among available guard interval lengths of the predetermined mode. Subsequently, the transition detector 370 and the period detector 380 detects the transition of the input accumulated values and detects the period of the detected transition, respectively.

The slicer 550 may be able to efficiently reduce the number of bits of the information of the accumulated phase differential signals. In one example, the slicer 550 includes a one-bit slicer, which is relatively simple in structure.

Figure 6:
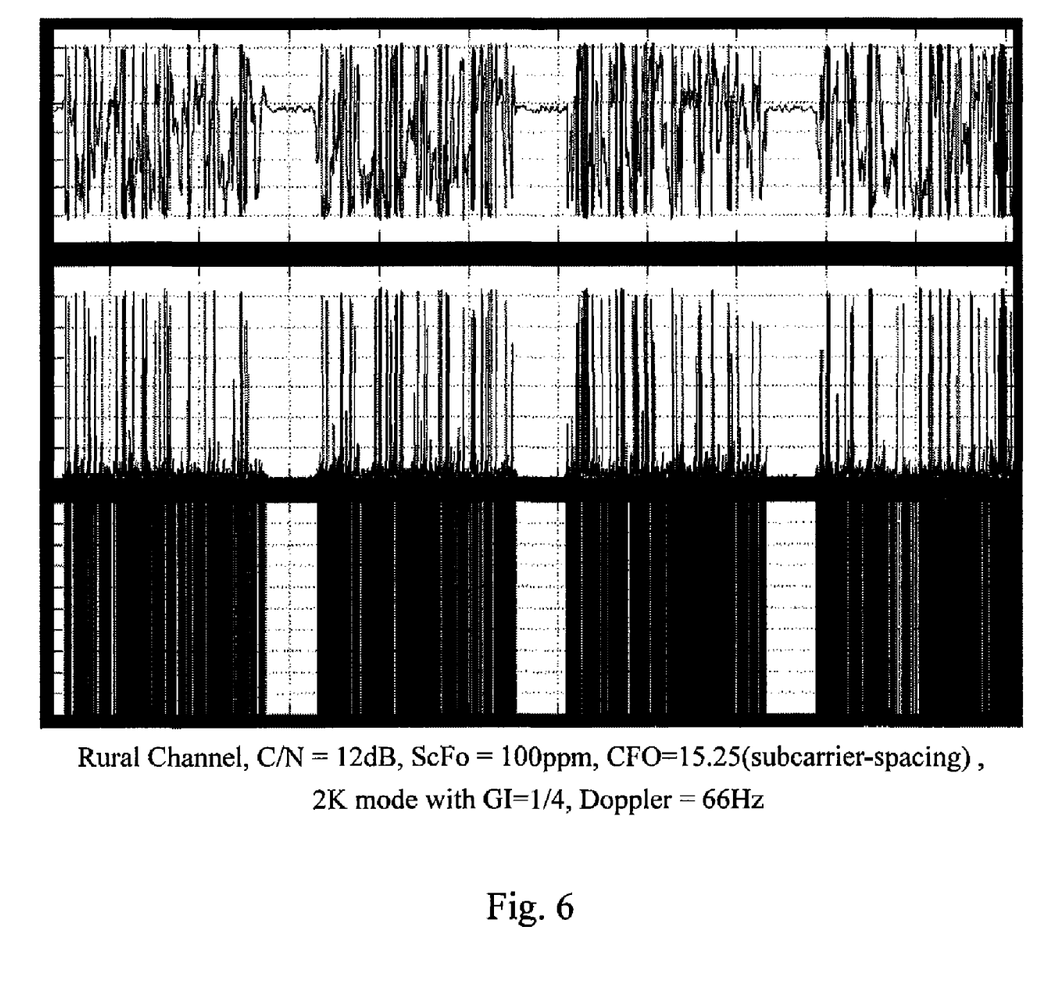
FIG. 6 is a diagram illustrating simulation results of the GI length detector illustrated in FIG. 5.

FIG. 6 is a diagram of simulation results of the output signals of the phase detector 130, the phase differential detector 340 and the slicer 550, illustrated in FIG. 5, respectively. Referring to FIG. 6, given a transmission in a rural channel, in which C/N=12 dB, 2K mode and GI=¼, the top, the middle and the bottom portions of FIG. 6 respectively display the detected phases output by the phase detector 130, ranging from −π to +π, the phase differential values output by the phase differential detector 340, ranging from 0 to 2π, and the result signals output by a 1-bit slicer 550. It is observed that the signals are simplified by the slicer 550.

Figure 7A:
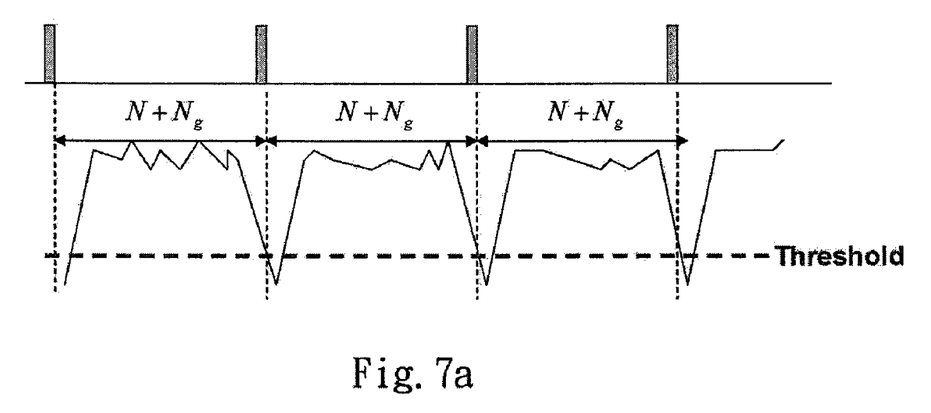
FIGS. 7a, 7b and 7c are diagrams illustrating the accumulated values input to a transition detector and the characteristic signals set in accordance by the transition detector.
Figure 7B:
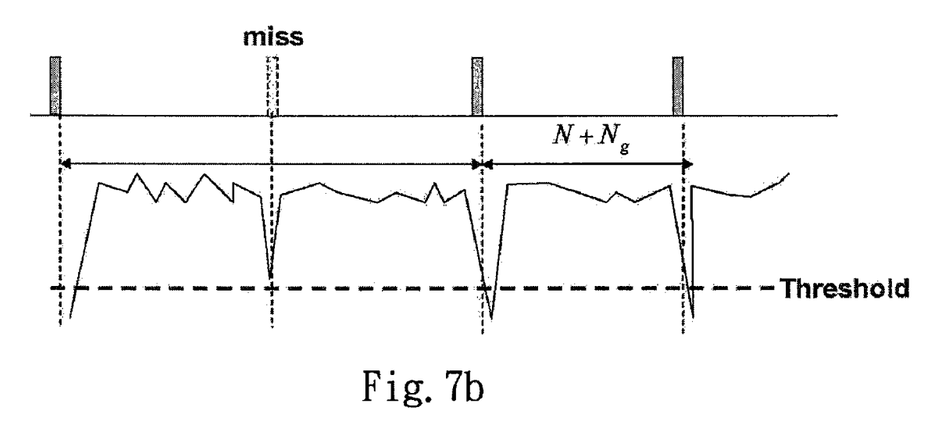
Figure 7C:
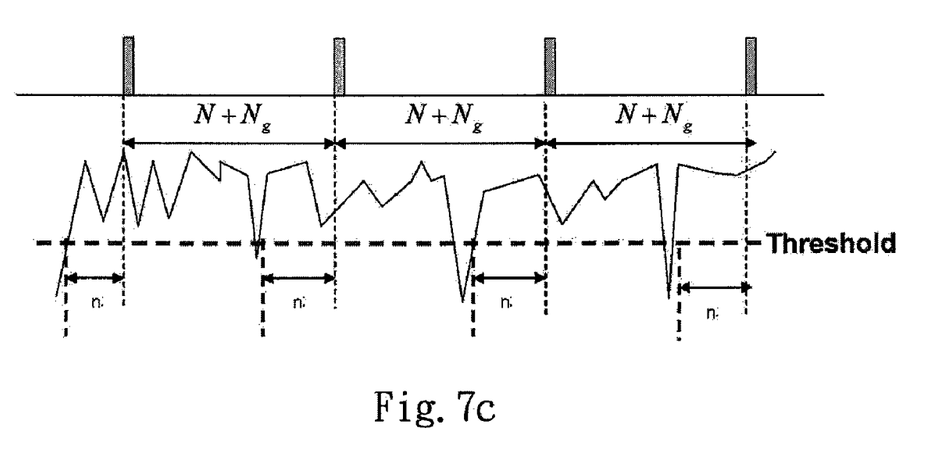

FIGS. 7a, 7b and 7c are diagrams illustrating the accumulated values input to the transition detector and the characteristic signals set by a transition detector according to the present invention. Referring to FIG. 7a, the transition detector compares the accumulated values with a predetermined threshold, and sets a characteristic signal when the comparison result changes from positive to negative. The period detector of the present invention then may determine the symbol length (N+Ng, that is, data length plus GI length) by detecting a period according to the characteristic signals. However, there may be error like noise or offset occurred in the signals. Referring to FIG. 7b, the error may result in an error in period detection. Referring to FIG. 7c, the transition detector of the GI length detector of the present invention compares the accumulated values with a predetermined threshold, which is a little greater than the threshold adopted in FIGS. 7a and 7b, and sets a characteristic signal when a first accumulated value is smaller than the predetermined threshold and a predetermined amount, n, of successive accumulated values immediately following the first accumulated value is greater than the predetermined threshold. As illustrated in FIG. 7c, the effect of the noise or drift of the signals is eliminated.

Figure 8:
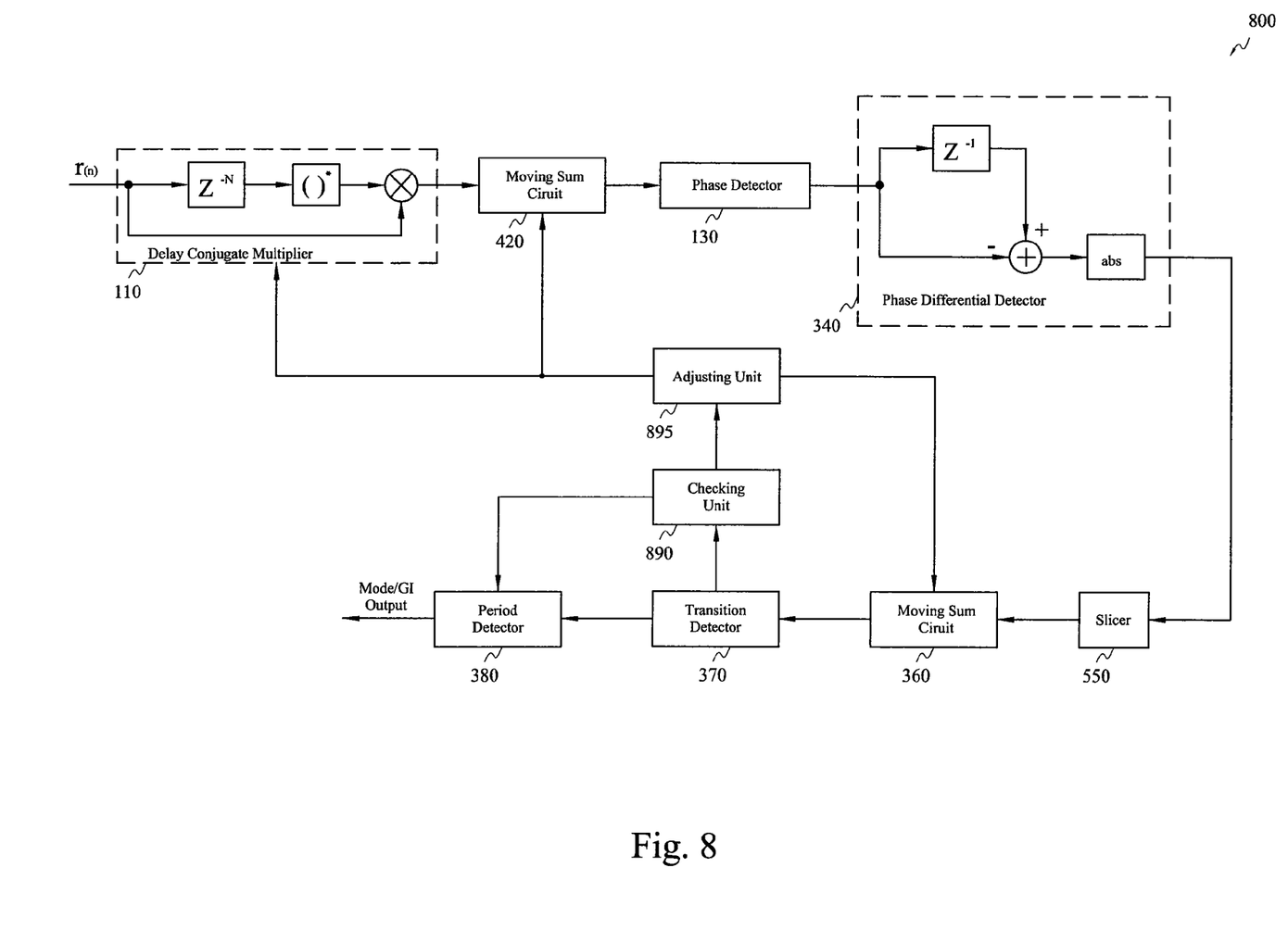
FIG. 8 is a block diagram of a GI length detector according to another example of the present invention.

When the mode of the received signals is unknown, which is often the case, there is a need to check and alternate the parameters in a GI detector. FIG. 8 is a block diagram illustrating an example of a GI length detector 800 of the present invention. The GI length detector 800 is similar to the GI length detector 500 illustrated in FIG. 5 except a checking unit 890 and an adjusting unit 895. The transition detector 370 detects the transition of the accumulated values from the moving sum circuit 360, and sends the detected transition to the checking unit 890 for checking if the detected transition conforms to an acceptable transition pattern. The checking unit 890 is coupled to the transition detector 370, the period detector 380 and the adjusting unit 895. If the checking unit 890 determines that the detected transition conforms to an acceptable pattern, the period detector 380 will detect the period of the transition detected by the transition detector 370, and in turn the GI length. On the other hand, if the checking unit 890 determines that the detected transition is not acceptable, the adjusting unit 895 will choose an undetected mode of the input signals, and adjust the delay length of the delay conjugate multiplier 110 and the window sizes of the two moving sum circuits 420 and 360 according to the chosen mode of the input signals. The example of the GI length detector 800 of the present invention then detects another set of parameters according to the chosen mode.

Figure 9:
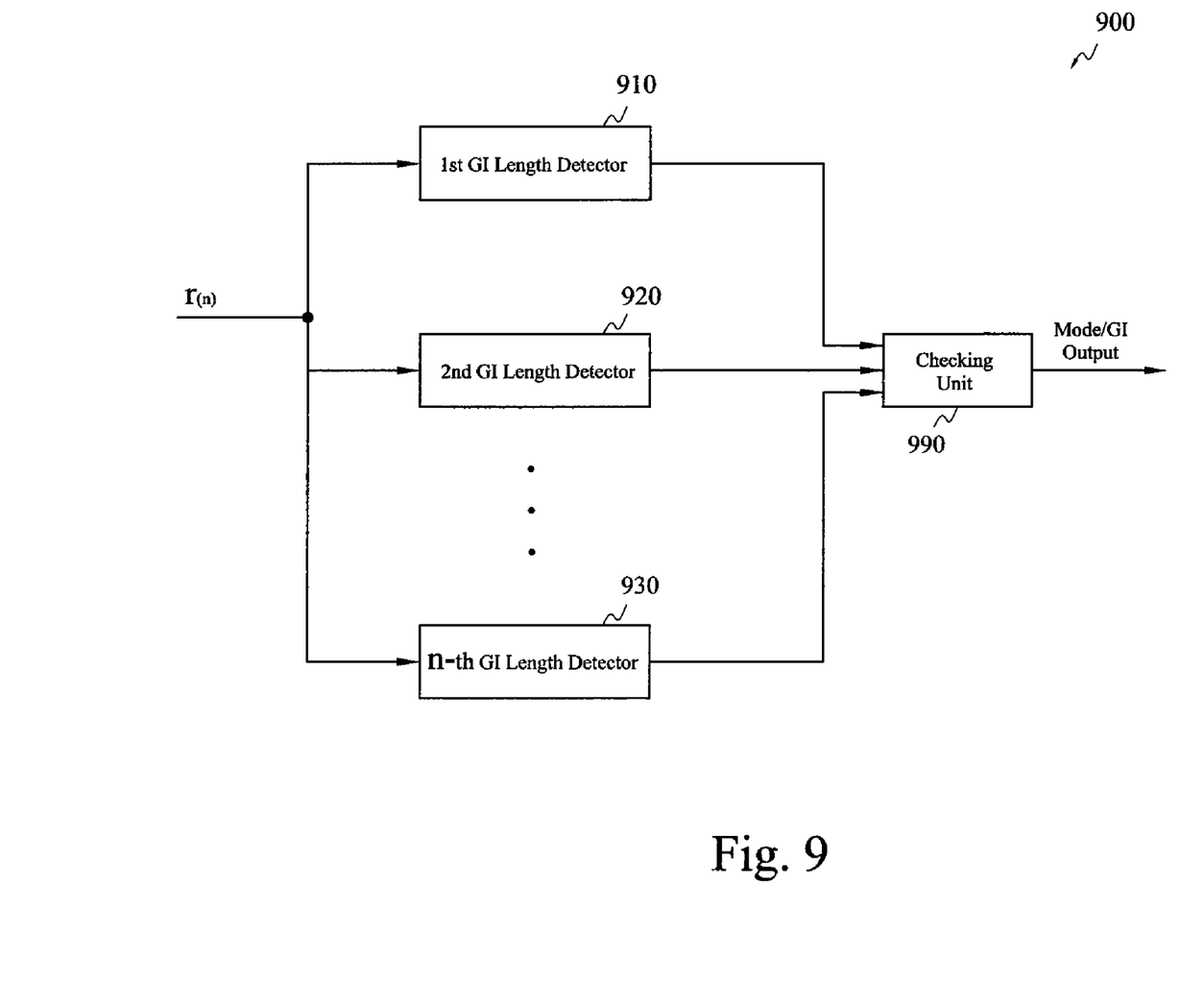
FIG. 9 is a block diagram of a GI length detecting apparatus according to an example of the present invention.

FIG. 9 is a block diagram of a GI length detecting apparatus 900 according to an example of the present invention. Referring to FIG. 9, the GI length detecting apparatus 900 includes GI length detectors 910, 920 and 930 connected in parallel to detect the GI mode of the received signals r(n). Each of the GI length detectors 910, 920 and 930 is similar in structure to the GI length detector 100 illustrated in FIG. 1, the GI length detector 300 illustrated in FIG. 3, the GI length detector 400 illustrated in FIG. 4, or the GI length detector 500 illustrated in FIG. 5. Each of the GI length detectors 910, 920 and 930 corresponds to a specific data mode of signals. As an example of the DVB-T system, the GI length detecting apparatus 900 includes two GI length detectors 910 and 920 for the 2K mode and the 8K mode, respectively. The GI length detecting apparatus 900 further includes a checking unit 990 coupled to each of the GI length detectors 910, 920 and 930 for checking if the pattern of the detected transition of each of the GI length detectors 910 and 920 conforms to one of the acceptable transition patterns corresponding to the predetermined data mode of the GI length detector. The GI length detecting apparatus 900 determines the GI length/mode of the received signals r(n) in accordance with the result of the checking unit 990. For example, assuming that the delay length of the delay correlation circuit and the window lengths of the moving sum circuit of the GI length detector 910 correspond to the 2K mode of DVB-T system, and the delay length of the delay correlation circuit and the window lengths of the moving sum circuit of the GI length detector 920 correspond to the 8K mode of DVB-T system, the GI length detecting apparatus 900 determines the GI mode according to the detecting result of the GI length detector 910 if the detected transition of the GI length detector 910 conforms to an acceptable patterns of the 2K mode more than the detected transition of the GI length detector 920 conforms to an acceptable patterns of the 8K mode. On the other hand, the GI length detecting apparatus 900 determines the GI mode according to the detecting result of the GI length detector 920 if the detected transition of the GI length detector 920 conforms to an acceptable patterns of the 8K mode more than the detected transition of the GI length detector 910 conforms to an acceptable patterns of the 2K mode.

In other examples according to the present invention, the threshold to determine the GI mode may be changed. For example, the checking circuit 990 of the GI length detecting apparatus 900 may be required to check a predetermined amount of successive detected periods of each of the GI length detectors. For instance, the GI length detecting apparatus 900 may determine the GI mode according to the GI length detector 920 only when three successive detected periods all conform to the acceptable pattern corresponding to the GI length detector 920.

The GI detecting circuit and the related method according to the present invention may reduce noise and channel effect that would otherwise occur to the delay correlation operations. Hence the drawback of hard to define of the threshold in the prior art is obviated.

Figure 10A:
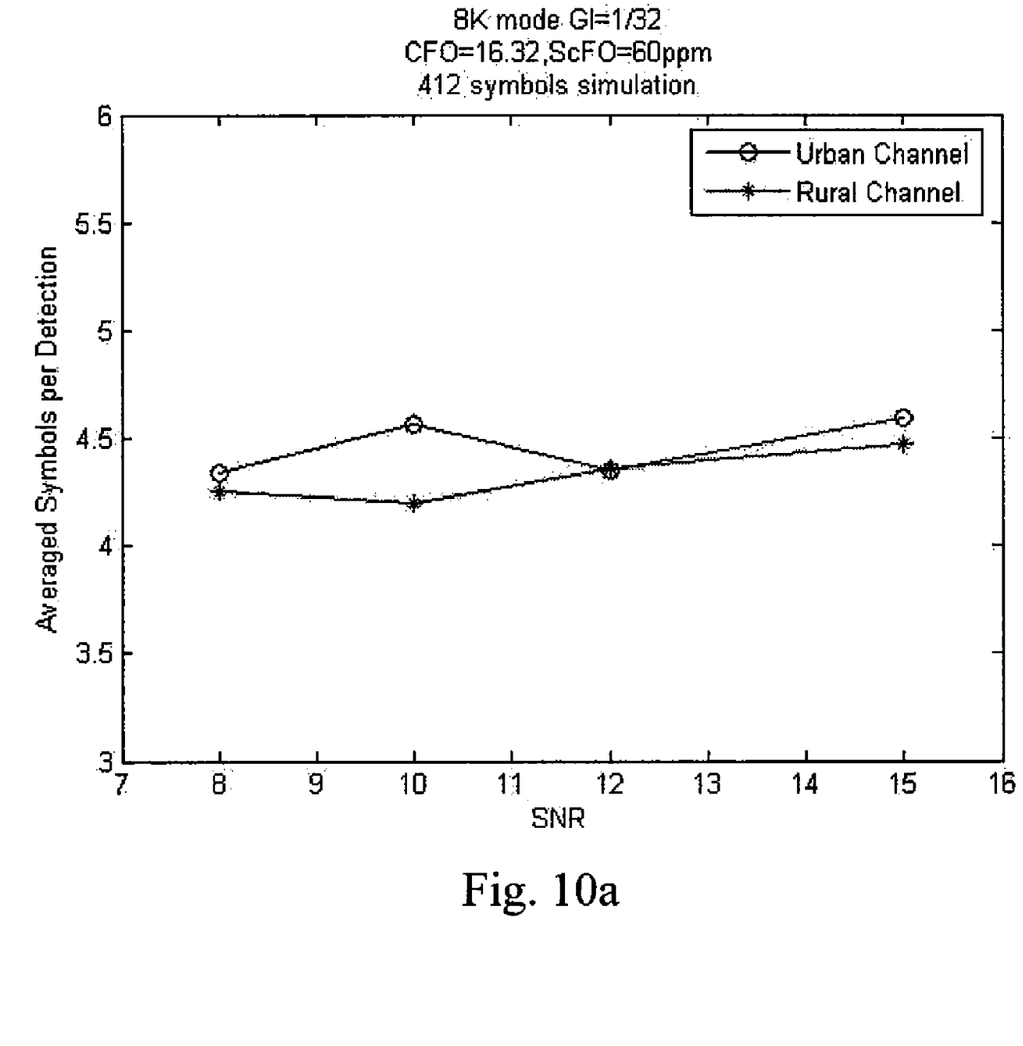
FIGS. 10a and 10b are plots of simulation results on the number of symbols required for successive GI length detection according to the present invention.
Figure 10B:
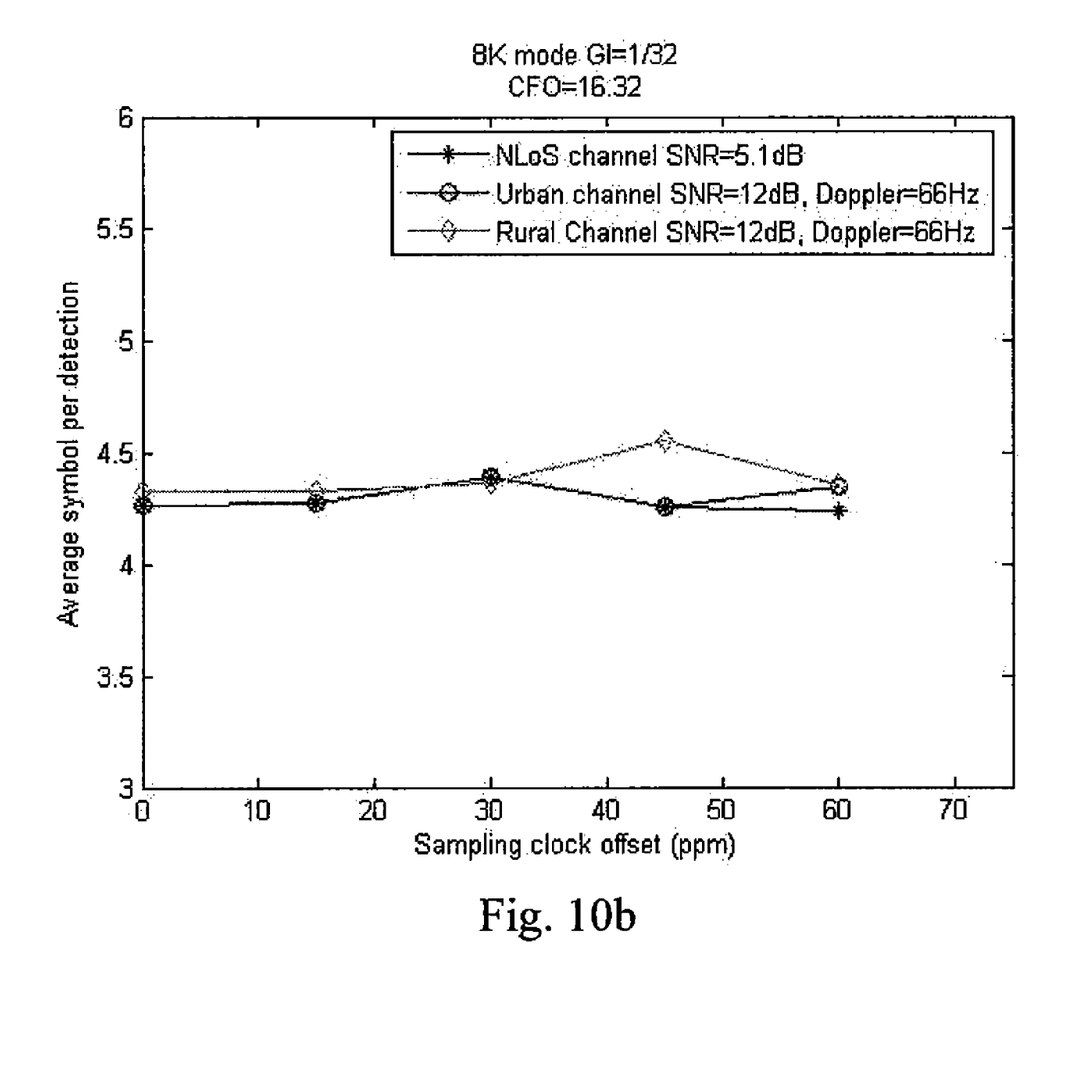

FIGS. 10a and 10b are plots illustrating the simulation results on the number of symbols required for successive three correct GI length detections according to the present invention. It can be found in FIGS. 10a and 10b that the present GI detecting method is robust against the sampling clock shifting and SNR.

Figure 11:
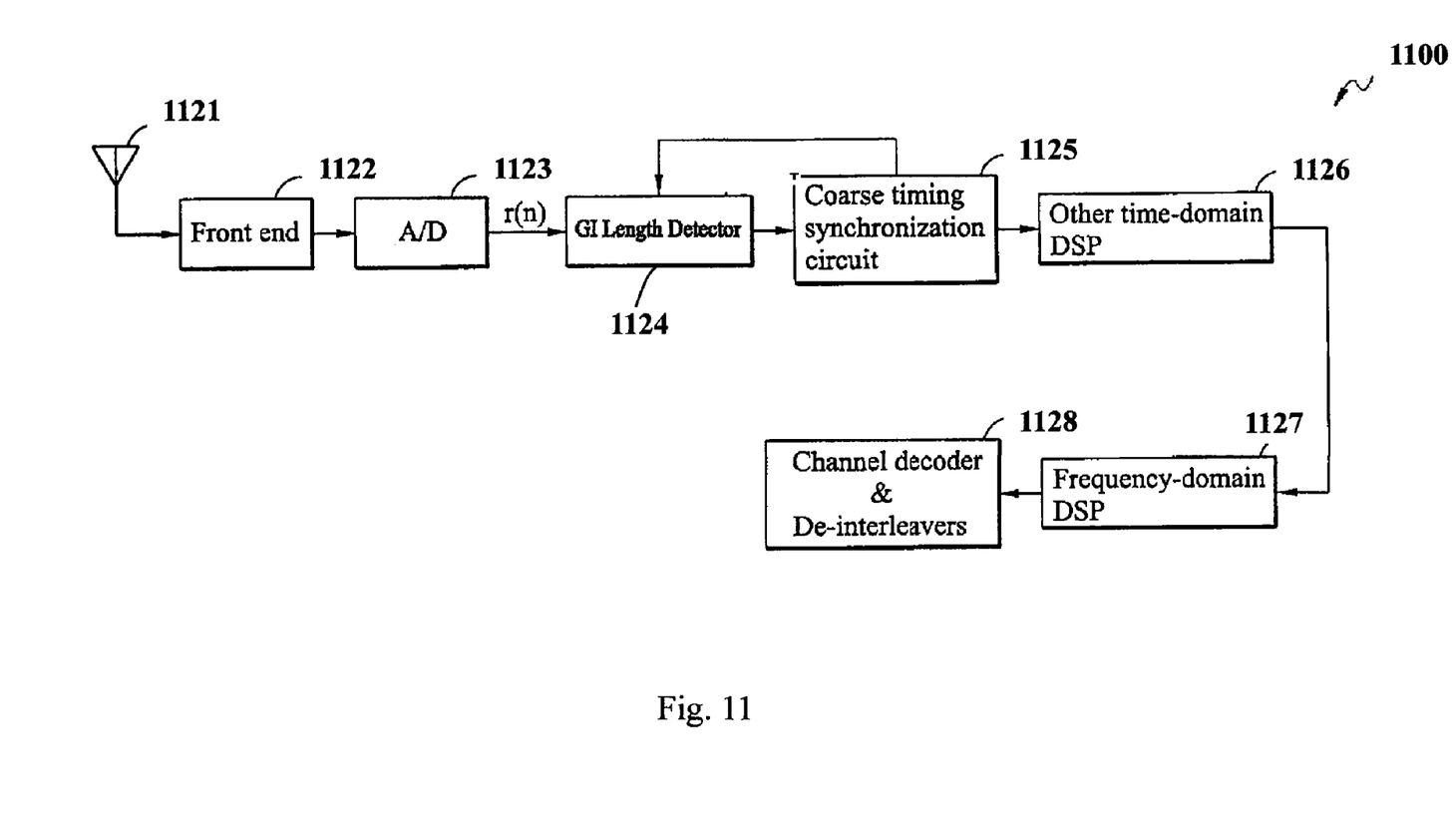
FIG. 11 is a block diagram of a receiver including a GI length detector according to an example of the present invention.

The GI length detecting method is applicable to an OFDM system that uses guard interval in its signal format. The GI length detector and the GI length detecting apparatus according to the present invention may be used to detect the GI mode in a receiver of the OFDM system. FIG. 11 is a block diagram of a receiver 1100 of a communication system, for example, the DVB-T system or other communication system. Referring to FIG. 11, an antenna 1121 receives wireless signals. A front end circuit 1122 down converts and processes the signals received from the antenna 1121. An analog to digital converter (A/D) 1123 converts input analog signals to digital ones. The digitized signals are first sent to a GI length detector 1124, which may be implemented by the GI length detector or the GI length detecting apparatus according to the present invention, for example, the GI length detectors 100, 300, 400, 500 and 800, or the GI length detecting apparatus 900 illustrated in the examples of the invention. After the GI length/data mode is detected, the digitized signals are sent to baseband processing modules, including a coarse timing synchronization circuit 1125, a time-domain DSP module 1126, a frequency-domain DSP module 1127 and a channel decoder and de-interleaver 1128. Please note that the receiver 1100 illustrated in FIG. 11 is exemplary only and is not restrictive of the invention. Other GI length detectors according to the present invention are also possible.

In summary, the present invention provides a guard interval length detector/detecting apparatus and the related methods with low complexity in structure and improved performance. The guard interval length detector and the related method according to the present invention may be applicable to the receivers of communication systems to determine the transmission mode and the guard interval length. Asymmetric Digital Subscriber Line (ADSL), Very-high-speed Digital Subscriber Line (VDSL), Wireless Local Area Network (WLAN) including IEEE 802.11a/g/n, Hiper LAN/2, Hiper-MAN, Ultra Wideband (UWB) and Dedicated Short Range Communications (DSRC) systems are examples of the communication systems that may use the present invention to detect the GI lenth. Furthermore, Integrated Service Digital Braodcasting-Terrestrial (ISDB-T), Digital Audio Broadcasting (DAB), Digital Video Broadcasting over satelite (DVB-S), cable (DVB-C), terrstrial (wireless) transmission (DVB-T), and handheld device (DVB-H) that adopt guard intervals in data format may use the apparatus and the method of the present for GI length detection.

In describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

I claim:

1. A guard interval length detector, comprising:
a delay conjugate multiplier configured to delay a plurality of input signals by a duration to provide delayed input signals and multiply each of the plurality of input signals with a complex conjugate of a corresponding one of the delayed input signals to provide multiplied signals;
a phase detector capable configured to determine phase values corresponding to the multiplied signals; and
a period detector configured to detect a period according to the phase values, and determine a guard interval length of the input signals according to the period.

2. The guard interval length detector of claim 1, wherein the duration corresponds to a predetermined mode of the input signals.

3. A guard interval length detector, comprising:
a delay conjugate multiplier configured to delay a plurality of input signals by a duration to provide delayed input signals and multiply each of the plurality of input signals with a complex conjugate of a corresponding one of the delayed input signals to provide multiplied signals;
a phase detector configured to determine phase values of the multiplied signals;
a phase differential detector configured to determine phase differential values, wherein each of the phase differential values is a difference between two successive phase;
a moving sum circuit configured to accumulate a plurality of sets of phase differential values to provide accumulated values, wherein each set of the phase differential values comprises an amount of the phase differential values;
a transition detector configured to detect a transition of the accumulated values; and
a period detector configured to detect a period according to the transition, and determine
a guard interval length of the input signals according to the period.

4. The guard interval length detector of claim 3, wherein the duration corresponds to a predetermined mode of the input signals.

5. The guard interval length detector of claim 3, wherein the amount of the phase differential values is equal to a shortest guard interval length among available guard interval lengths of a predetermined mode of the input signals.

6. The guard interval length detector of claim 3, wherein the transition detector is configured to compare the accumulated values to a predetermined threshold to provide a comparison result, and set characteristic signals when the comparison result changes from positive to negative.

7. The guard interval length detector of claim 3, wherein the transition detector is configured to compare the accumulated values to a predetermined threshold to provide a comparison result, and set characteristic signals when the comparison result changes from negative to positive.

8. The guard interval length detector of claim 3, wherein the transition detector is configured to compare the accumulated values to a predetermined threshold to provide a comparison result, and set characteristic signals when a first accumulated value of the accumulated values is lower than the predetermined threshold and an amount of successive accumulated values immediately following the first accumulated value are higher than the predetermined threshold.

9. A guard interval length detector, comprising:
a delay conjugate multiplier configured to delay a plurality of input signals by a duration to provide delayed input signals and multiply each of the plurality of input signals with a complex conjugate of a corresponding one of the delayed input signals to provide multiplied signals;
a first moving sum circuit configured to accumulate a plurality of sets of the multiplied signals to provide auto-correlation signals, wherein each set of the multiplied signals comprises a first amount of successive multiplied signals of the multiplied signals;
a phase detector configured to determine phase values of the auto-correlation signals;
a phase differential detector configured to determine phase differential values, wherein each of the phase differential values is a difference between two successive phase values;
a second moving sum circuit configured to accumulate a plurality of sets of the phase differential values to provide accumulated values, wherein each set of the phase differential values comprises a second amount of the phase differential values;
a transition detector configured to detect a transition of the accumulated values; and
a period detector configured to detect a period according to the transition, and determine a guard interval length of the input signals according to the period.

10. The guard interval length detector of claim 9, wherein the duration corresponds to a predetermined mode of the input signals.

11. The guard interval length detector of claim 9, wherein the first amount is less than a predetermined length of the guard interval length of the input signals.

12. The guard interval length detector of claim 9, wherein the second amount is equal to a shortest guard interval length among available guard interval lengths of a predetermined mode of the input signals.

13. A guard interval length detector, comprising:
a delay conjugate multiplier configured to generate multiplied signals;
a first moving sum circuit configured to accumulate a plurality of sets of the multiplied signals to provide auto-correlation signals, wherein each set of the multiplied signals comprises a first amount of successive multiplied signals of the multiplied signals;
a phase detector configured to determine phase values of the auto-correlation signals;
a phase differential detector configured to determine phase differential values, wherein each of the phase differential values is a difference between two successive phase;
a slicer configured to compare the phase differential values to a predetermined threshold, and output result signals;
a second moving sum circuit configured to accumulate a plurality of sets of the result signals to provide accumulated values, wherein each set of the result signals comprises a second amount of the result signals;
a transition detector configured to detect a transition of the accumulated values; and
a period detector configured to detect a period according to the transition, and determine a guard interval length of the input signals according to the period.

14. The guard interval length detector of claim 13, wherein the first amount is less than a predetermined length of the guard interval length of the input signals.

15. The guard interval length detector of claim 13, wherein the second amount is equal to a shortest guard interval length among available guard interval lengths of a predetermined mode of the input signals.

16. The guard interval length detector of claim 13, wherein the slicer includes a one-bit slicer.

17. The guard interval length detector of claim 16, further comprising:
   a checking unit configured to check whether the transition conforms to one of a first set of acceptable transition patterns; and
   an adjusting unit configured to adjust a duration of the delay conjugated multiplier, the first amount and the second amount in accordance with another predetermined mode of the input signals when the transition does not conform the first set of acceptable transition patterns;
   wherein the period detector is configured to determine the guard interval length of the input signals according to the period if the transition conforms to one of the first set of acceptable transition patterns.

18. A guard interval length detecting apparatus, comprising:
   a first guard interval length detector configured to perform guard interval length detection corresponding to a first mode of input signals according to phase of the input signals and generate a first detection result;
   a second guard interval length detector configured to perform guard interval length detection corresponding to a second mode of the input signals according to the phase of the input signals and generate a second detection result, the second guard interval length detector being configured to perform guard interval length detection corresponding to the second mode in parallel with the first guard interval length detector being configured to perform guard interval length detection corresponding to the first mode; and
   a checking unit configured to receive the first and second detection results from the first and second guard interval length detectors, and determine if the input signals are of the first mode or the second mode based on the first and second detection results, including being configured to check if the first detection result provided by the first guard interval length detector conforms to one of a first set of acceptable transition patterns corresponding to the first mode of the input signals, and check if the second detection result provided by the second guard interval length detector conforms to one of a second set of acceptable transition patterns corresponding to the second mode of the input signals.

19. The guard interval length detecting apparatus of claim 18, wherein the first guard interval length detector comprises:
   a delay conjugate multiplier configured to delay the input signals by a first duration to provide delayed input signals and multiply each of the input signals with a complex conjugate of a corresponding one of the delayed input signals to provide multiplied signals;
   a phase detector configured to obtain phase values corresponding to the multiplied signals; and
   a period detector configured to detect a period according to the phase values, and determine a first guard interval length according to the period.

20. The guard interval length detecting apparatus of claim 18, wherein the first guard interval length detector comprises:
   a delay conjugate multiplier configured to delay the input signals by a first duration to provide delayed input signals and multiply each of the input signals with a complex conjugate of a corresponding one of the delayed input signals to provide multiplied signals;
   a phase detector configured to obtain phase values corresponding to the multiplied signals;
   a phase differential detector configured to obtain phase differential values, wherein each of the phase differential values is a difference of two successive phase values of the phase values;
   a moving sum circuit configured to accumulate a plurality of sets of phase differential values to provide accumulated values, wherein each set of the phase differential values comprises a first amount of the phase differential values;
   a transition detector configured to detect a transition of the accumulated values; and
   a period detector configured to detect a period according to the transition, and determine a first guard interval length according to the period.

21. The guard interval length detecting apparatus of claim 18, wherein the first guard interval length detector comprises:
   a delay conjugate multiplier configured to delay a plurality of input signals by a first duration to provide delayed input signals and multiply each of the plurality of input signals with a complex conjugate of a corresponding one of the delayed input signals to provide multiplied signals;
   a first moving sum circuit configured to accumulate a plurality of sets of the multiplied signals to provide auto-correlation signals, wherein each set of the multiplied signals comprises a first amount of successive multiplied signals of the multiplied signals;
   a phase detector configured to obtain phase values of the auto-correlation signals;
   a phase differential detector configured to obtain phase differential values, wherein each of the phase differential values is a difference of two successive phase values of the phase values;
   a second moving sum circuit configured to accumulate a plurality of sets of the phase differential values to provide accumulated values, wherein each set of the phase differential values comprises a second amount of the phase differential values;
   a transition detector configured to detect a transition of the accumulated values; and
   a period detector configured to detect a period according to the transition, and determine a first guard interval length according to the period.

22. The guard interval length detecting apparatus of claim 18, wherein the first guard interval length detector comprises:
   a delay conjugate multiplier configured to delay a plurality of input signals by a first duration to provide delayed input signals and multiply each of the plurality of input signals with a complex conjugate of a corresponding one of the delayed input signals to provide multiplied signals;
   a first moving sum circuit configured to accumulate a plurality of sets of the multiplied signals to provide auto-correlation signals, wherein each set of the multiplied signals comprises a first amount of successive multiplied signals of the multiplied signals;
   a phase detector configured to obtain phase values of the auto-correlation signals;

a phase differential detector configured to obtain phase differential values, wherein each of the phase differential values is a difference of two successive phase values of the phase values;

a slicer configured to compare the phase differential values to a predetermined threshold, and output result signals correspondingly;

a second moving sum circuit configured to accumulate a plurality of sets of the result signals to provide accumulated values, wherein each set of the result signals comprises a second amount of the result signals;

a transition detector configured to detect a transition of the accumulated values; and a period detector configured to detect a period according to the transition, and determine a first guard interval length according to the period.

23. The guard interval length detecting apparatus of claim 22, wherein the slicer includes a one-bit slicer.

24. A method of guard interval length detection, comprising:

delaying a plurality of input signals by a duration;

multiplying each of the input signals with a complex conjugate of a corresponding one of the delayed input signal;

determining phase values corresponding to the multiplied signals;

detecting a period according to the phase values; and determining a guard interval length of the input signals according to the period.

25. The method of claim 24, further comprising:

determining phase differential values, wherein each of the phase differential values is a difference between two successive phase values;

accumulating a plurality of sets of phase differential values to provide accumulated values, wherein each set of the phase differential values comprises an amount of the phase differential values; and detecting a transition of the accumulated values;

wherein the step of detecting a period according to the phase values comprises detecting a period according to the accumulated values.

26. The method of claim 25, further comprising:

accumulating a plurality of sets of the multiplied signals to provide auto-correlation signals, wherein each set of the multiplied signals comprises a first amount of successive multiplied signals of the multiplied signals;

wherein the step of determining phase values corresponding to the multiplied signals comprises determining phase values corresponding to the auto-correlation signals.

27. The method of claim 25, further comprising:

slicing the phase differential values to provide result signals;

wherein the step of accumulating a plurality of sets of phase differential values to provide accumulated values comprises accumulating a plurality of sets of the result signals to provide accumulated values.

28. The method of claim 24, further comprising:

checking whether the period conforms to one of a first set of acceptable patterns.

29. The guard interval length detector of claim 9, wherein the transition detector is configured to compare the accumulated values to a predetermined threshold to provide a comparison result, and set characteristic signals when a first accumulated value of the accumulated values is lower than the predetermined threshold and an amount of successive accumulated values immediately following the first accumulated value are higher than the predetermined threshold.

30. The guard interval length detector of claim 13, wherein the transition detector is configured to compare the accumulated values to a predetermined threshold to provide a comparison result, and set characteristic signals when a first accumulated value of the accumulated values is lower than the predetermined threshold and an amount of successive accumulated values immediately following the first accumulated value are higher than the predetermined threshold.

31. The guard interval length detecting apparatus of claim 20, wherein the transition detector is configured to compare the accumulated values to a predetermined threshold to provide a comparison result, and set characteristic signals when a first accumulated value of the accumulated values is lower than the predetermined threshold and an amount of successive accumulated values immediately following the first accumulated value are higher than the predetermined threshold.

32. The guard interval length detecting apparatus of claim 22, wherein the transition detector is configured to compare the accumulated values to a predetermined threshold to provide a comparison result, and set characteristic signals when a first accumulated value of the accumulated values is lower than the predetermined threshold and an amount of successive accumulated values immediately following the first accumulated value are higher than the predetermined threshold.

33. The method of claim 25, wherein the step of detecting a transition comprises comparing the accumulated values to a predetermined threshold to provide a comparison result, and setting characteristic signals when a first accumulated value of the accumulated values is lower than the predetermined threshold and an amount of successive accumulated values immediately following the first accumulated value are higher than the predetermined threshold.

* * * * *